June 16, 1964 H. W. BERRY 3,137,790

COMPUTING APPARATUS

Filed Dec. 30, 1958

INVENTOR.
HENRY W. BERRY

BY George W. Field

ATTORNEY

United States Patent Office 3,137,790

Patented June 16, 1964

3,137,790
COMPUTING APPARATUS

Henry W. Berry, Largo, Fla., assignor to Minneapolis-Honeywell Regulator Company, Minneapolis, Minn., a corporation of Delaware Filed Dec. 30, 1958, Ser. No. 783,888
10 Claims. (Cl. 235—183)

This invention relates to computing apparatus, and more particularly relates to an improved electric integrator.

In recent years electric integrators have found extensive use in the engineering and scientific arts, especially in conjunction with analog computers. The most common type of electric integrator is an arrangement known as the parallel-feedback integrator, which comprises a high gain D.C. amplifier with a capacitor, which may be referred to as an integrating capacitor, providing a feedback path from the output to the input of the amplifier. Parallel-feedback integrators have been developed which display a fairly high degree of accuracy, the errors due to amplifier distortion, drift, and the like having been overcome to a large extent by a variety of circuit refinements. Errors due to the effective leakage resistance of the integrating capacitor, however, have heretofore gone without correction, as have errors due to the finite amplification of the amplifier. It is these sources of error that my invention overcomes.

Brieflly, the manner in which my invention overcomes the above mentioned errors is to obtain a portion, equal to the reciprocal of the effective time constant of the integrating circuit, of the output signal of the integrator being corrected, to integrate this portion, and to add the resulting integrated signal to the output signal of the integrator being corrected, the resulting sum representing the corrected integral.

It is accordingly an object of my invention to provide an arrangement whereby an electric integrator may be corrected for error due to the leakage resistance of its integrating capacitor.

It is the further object of my invention to provide a method of correcting an integration process wherein error is encountered due to the finite amplification of the integrating amplifier.

Figure 1:
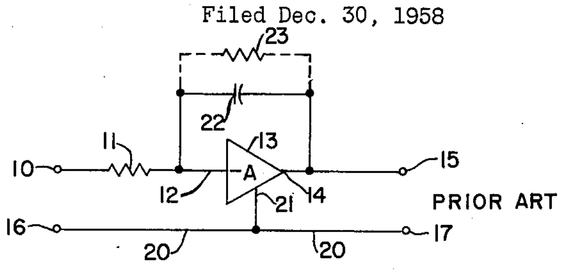
Figure 2:
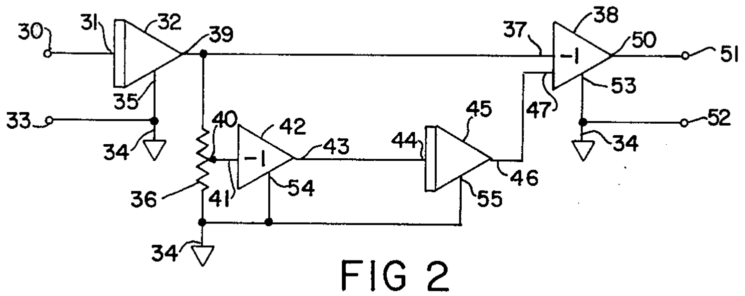
Figure 3:
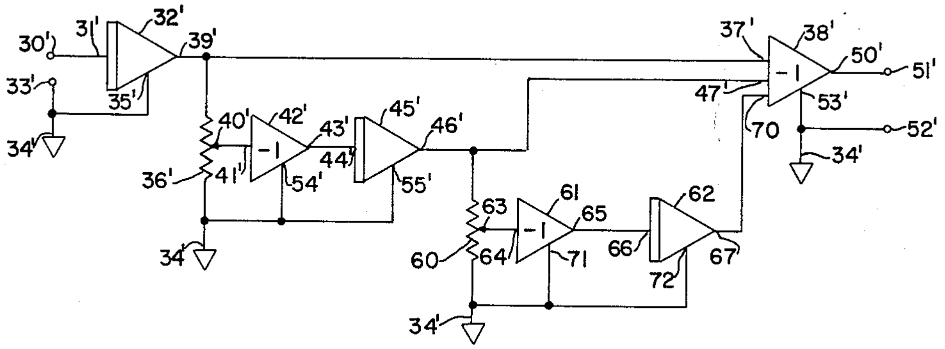
Figure 4:
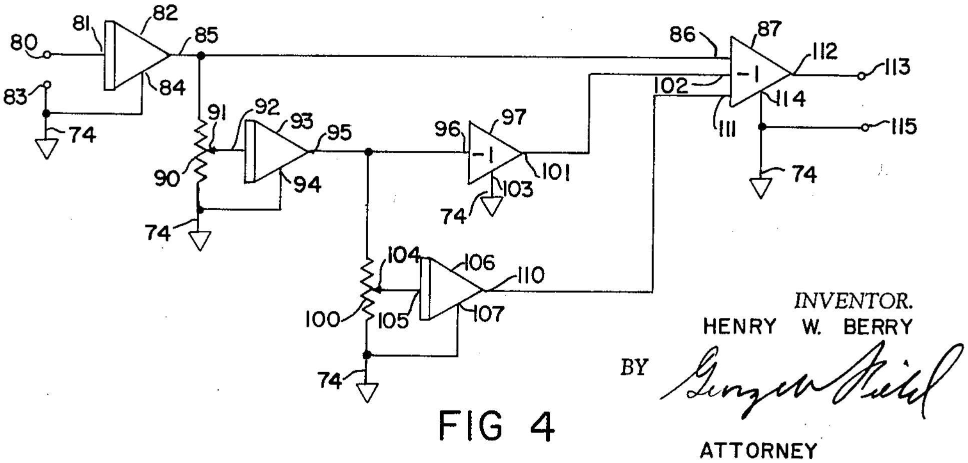

These and other objects of my invention will be more thoroughly understood through reference to the following specification, claims, and drawings, of which:

FIGURE 1 is a schematic representation of a parallel-feedback integrator well known in the art, FIGURE 2 is a schematic represenattion of an integrator embodying my invention, FIGURE 3 is a schematic representation of an integrator similar to that of FIGURE 2, but containing a still further refinement according to my invention, and FIGURE 4 is a schematic representation of an integrator similar to that shown in FIGURE 3, but simplified somewhat by rearrangement of components.

FIGURE 1

FIGURE 1 is a schematic drawing of a conventional parallel-feedback integrator. An input terminal 10 is connected through an input resistor 11 to an input 12 of a D.C. amplifier 13. The output 14 of amplifier 13 is connected to an output terminal 15. Another input terminal 16 is connected to another output terminal 17 by a conductor 20, which is also connected to amplifier ground point 21. Connected across input 12 and output 14 of amplifier 13 is an integrating capacitor 22, which has a parallel leakage resistance shown as resistor 23.

A thorough discussion of the parallel-feedback integrator, such as shown in FIGURE 1, may be found in Chapter 4, Section 5, of Electronic Analog Computers, by Korn & Korn, published by McGraw-Hill Book Company, Inc. in 1952. Chapter 5 of the same publication presents and analyzes several D.C. amplifiers suitable for use in the position of amplifier 13 of FIGURE 1. It is sufficient here to point out that the integrator of FIGURE 1 operates to produce an output voltage across terminals 15 and 17 equal approximately to the negative of the time integral of the voltage applied across input terminals 10 and 16. This output voltage, or integral signal, however, is subject to error due to the leakage resistance 23 of integrating capacitor 22 and the finite amplification of amplifier 13. It should be understood, of course, that leakage resistor 23 here represents all forms of electric leakage between terminals 12 and 14 and is not necessarily restricted to the actual leakage across the capacitor's dielectric.

Upon the assumption that the current flow in the input 12 of amplifier 13 is zero (or negligible), it can be shown that the output voltage of the integrator for a step function input is:

$$E_o = KV(1-e^{-t/T}) \qquad (1)$$

where $E_o$ is the output voltage, $$K = \frac{-A}{(1+A)\frac{R}{R_L}+1}$$

V is the magnitude of the step input,
$t$ is the time in seconds, $$T = \frac{(1+A)RC}{(1+A)R/R_L+1}$$

the effective time constant of the circuit,
R is the value of input resistor 11,
$R_L$ is the value of leakage resistor 23,
C is the value of integrating capacitor 22, and
A is the amplification factor of amplifier 13.

It can also be shown that for very large values of amplification of amplifier 13, K approaches a value of $$\frac{R_L}{-R}$$

and T approaches a value of $R_LC$.

Further the term $e^{-t/T}$ can be expressed as $$e^{-t/T} = 1 - \frac{t}{T} + \tfrac{1}{2}(t/T)^2 - \tfrac{1}{6}\left(\frac{t}{T}\right)^3 + \cdots \qquad (2)$$

Substituting Equation 2 into Equation 1 yields:

$$E_o = KV\left[\frac{t}{T} - \tfrac{1}{2}\left(\frac{t}{T}\right)^2 + \tfrac{1}{6}\left(\frac{t}{T}\right)^3 - \cdots\right] \qquad (3)$$

But, for a step input, a perfect integrator would give an output proportional only to the first order term of the series in Equation 3. That is, a perfect integrator would yield:

$$E_o = KV\frac{t}{T} \qquad (4)$$

It is therefore evident that the higher order terms of Equation 3 represent the error, $E_e$, in the integration. Thus:

$$E_e = KV\left[-\tfrac{1}{2}\left(\frac{t}{T}\right)^2 + \tfrac{1}{6}\left(\frac{t}{T}\right)^3 - \tfrac{1}{24}\left(\frac{t}{T}\right)^4 \cdots\right] \qquad (5)$$

It is now noted that integrating Equation 3 and multiplying it by $1/T$ gives:

$$\frac{1}{T}\int_0^t E_o dt = KV\left[\tfrac{1}{2}\left(\frac{t}{T}\right)^2 + \tfrac{1}{6}\left(\frac{t}{T}\right)^3 + \tfrac{1}{24}\left(\frac{t}{T}\right)^4\right] \qquad (6)$$

Each side of Equation 6 is the negative of Equation 5. Equation 6 may therefore be added to Equation 3 to give, as the sum, the perfect time integral of the step function input of the integrator:

$$E_o+\frac{1}{T}\int_0^t E_o dt=KV\frac{t}{T} \quad (7)$$

Apparatus which substantially accomplishes the operation of Equation 7 is shown in FIGURE 2, which will be explained presently.

The above analysis was carried out for a step function input, but any waveform can be considered as a combination of steps, and consideration of the superposition theorem makes it evident that a reduction in error for a step input holds true for an input of any wave shape.

FIGURE 2

In FIGURE 2, an input terminal 30 is connected to the input 31 of an integrator 32. Integrator 32 is of the type shown in FIGURE 1 and includes all of the elements therein. Integrator 32 is depicted in FIGURE 2 by a symbol well known in the art. Another input terminal 33 is connected to common point 34 and is also connected to amplifier ground point 35 of integrator 32. Output 39 of integrator 32 is connected to one end of the winding of a potentiometer 36 having a tap 40, the other end of the winding is connected to common point 34. Output 39 is also connected to an input 37 of a summing amplifier 38. Summing amplifier 38 is of the type well known in the art that produces as an output the negative of the algebraic sum of the inputs thereto. The movable tap 40 of potentiometer 36 is connected to input 41 of another summing amplifier 42. The output 43 of amplifier 42 is connected to input 44 of a further integrator 45. Integrator 45 may be of the same type as integrator 32. The output 46 of integrator 45 is connected to an input 47 of summing amplifier 38. The output 50 of summing amplifier 38 is connected to an output terminal 51, and a further output terminal 52 is connected to common point 34 and to amplifier ground point 53 of amplifier 38. Amplifier ground points 54 and 55 of amplifier 42 and integrator 45, respectively, are connected to common point 34.

The operation of FIGURE 2 is as follows: A signal to be integrated is applied across terminals 30 and 33, whereupon output 39 of integrator 32 presents a signal approximately equal to the time integral of the input signal. Output 39 is connected to potentiometer 36, and the tap 40 of potentiometer 36 is so adjusted that the signal presented as an input to amplifier 42 is equal to the output of integrator 32 divided by the effective time constant, T. The purpose of amplifier 42 is simply to change the polarity of the signal from tap 40, so that the ultimate correction signal is added to, rather than subtracted from, the output of integrator 32. The output of amplifier 42, then, has the same magnitude as its input, but is reversed in polarity. This output signal is applied to input 44 of integrator 45, the output of which is added in summing amplifier 38 to the output of integrator 32. The output signal of amplifier 38, that is, the signal appearing across terminals 51 and 52, is therefore approximately equal to the left hand side of Equation 7, above. The signal appearing across output terminals 51 and 52 therefore represents the time integral of the input signal applied to input terminals 30 and 33 corrected for error due to leakage resistance in the integrating capacitor of integrator 32 and due to the finite, or non-finite, value of A, the amplification factor of the amplifier of integrator 32.

The correction explained above greatly increases the accuracy of the integration process. It is realized, of course, that integrator 45, which is used to integrate the correct portion of the output signal of integrator 32, is itself subject to error due to leakage resistance across its integrating capacitor. The magnitude of error contributed by integrator 45 is of a much smaller magnitude than that contributed originally by integrator 32, however, so that the arrangement shown still provides a great improvement in the overall accuracy of the integration process.

The error due to the integrator 45 may be corrected in the same manner as that produced by integrator 32, should the need arise for further improvement in the accuracy obtainable. An arrangement for doing this is shown in FIGURE 3.

FIGURE 3

Most of the circuit of FIGURE 3 is identical to that of FIGURE 2, and those components of FIGURE 3 that correspond to components of FIGURE 2 are referenced by the same numerals primed. The additional components of FIGURE 3 are a potentiometer 60, an amplifier 61, and an integrator 62. These additional components are connected so as to correct for the error due to leakage resistance of the integrating capacitor of integrator 45' and the finite amplification of the amplifier of integrator 45'. Output 46' is connected to the upper end of the winding of potentiometer 60 the lower end of which is connected to common point 34'. The tap 63 of potentiometer 60 is connected to input 64 of polarity reversing amplifier 61. Tap 63 is adjusted so as to apply a signal to amplifier 61 equal to the output of integrator 45' divided by the effective time constant of the integrating capacitor of integrator 45'. The output 65 of amplifier 61 is connected to input 66 of integrator 62, the output 67 of integrator 62 being in turn connected to an input 70 of summing amplifier 38'. The amplifier ground points 71 and 72 of amplifier 61 and integrator 62, respectively, are connected to common point 34'.

It is seen that in FIGURE 3 the portion of the circuit including potentiometer 60, amplifier 61 and integrator 62 correct for error due to capacitor leakage resistance and finite amplifier amplification in integrator 45' just as the part of the circuit including potentiometer 36', amplifier 42', and integrator 45' correct for error due to the integrating capacitor leakage resistance and finite amplifier amplification in integrator 32'. This correction process of course, may be carried as far as desired. For example the small error developed in integrator 62 may, if desired, be corrected in the same manner.

FIGURE 4

FIGURE 4 is a circuit that produces precisely the same result as the circuit in FIGURE 3, but by slight rearrangement of components eliminates one of the polarity reversing amplifiers. An input terminal 80 is connected to the input 81 of an integrator 82. Another input terminal 83 is connected to a common point 74 and is also connected to amplifier ground point 84 of integrator 82. The output 85 of integrator 82 is connected to an input 86 of a summing amplifier 87 and is also connected to the upper end of the winding of a potentiometer 90, the lower end of which is connected to common point 74. The tap 91 of potentiometer 90 is connected to the input 92 of an integrator 93. The amplifier ground point 94 of integrator 93 is connected to common point 74. The output 95 of integrator 93 is connected to input 96 of polarity reversing amplifier 97 and is also connected to the upper end of the winding of a further potentiometer 100, the lower end of which is connected to common point 74. The output 101 of amplifier 97 is connected to an input 102 of summing amplifier 87, and the amplifier ground point 103 of amplifier 97 is connected to common point 74. A tap 104 on potentiometer 100 is connected to input 105 of an integrator 106. The amplifier common point 107 of integrator 106 is connected to common point 74, and the output 110 of integrator 106 is connected to an input 111 of summing amplifier 87. Output 112 of summing amplifier 87 is connected to an output terminal 113, and amplifier ground point 114 of amplifier 87 is connected to common point 74 and is also connected to a further output terminal 115.

It is evident by inspection of the circuit of FIGURE 4 that the signal applied to input 102 of summing amplifier 87 substantially corrects for the error of integrator 82 and that the signal presented to input 111 of summing amplifier 87 substantially corrects for error of integrator 93. Thus, the output signal across terminals 113 and 115 is a highly accurate representation of the time integral of the input signal applied to intput terminals 80 and 83. The arrangements shown in FIGURE 3 and FIGURE 4 offer the same degree of accuracy, the only difference being a rearrangement of components in FIGURE 4 to eliminate one polarity reversing amplifier.

It should be pointed out that, while the exact value of the effective time constant, T, may be calculated according to the formula previously presented, a good approximation is had by taking T as equal to $R_LC$. As pointed out previously, T approaches $R_LC$ for very large values of amplification of the associated amplifier. Since suitable amplifiers having very large amplification factors are available to present-day designers, it is a matter of design choice as to whether to use the exact value of T in a particular embodiment of the invention or to use an approximation.

Since many variations and modifications of my invention will undoubtedly occur to those skilled in the art, I wish it to be understood that the scope of my invention is not limited to the particular embodiments shown herein for the purpose of illustration, but is limited only by the appended claims.

I claim:

1. An error-corrected integrator comprising: a first electronic integrator having input and output circuits, and having an amplifier and a feedback path around the amplifier, the feedback path including a capacitor having a capacitance, C, and a parallel leakage resistance, R, the parallel leakage resistance causing an error in the output of said first integrator; potentiometer means connected to the output circuit of said first integrator for producing an output signal equal approximately to $1/RC$ times the output of said first integrator; a second integrator; means applying as an input to said second integrator the output signal of said potentiometer means; and means connected to said first and second integrators for adding the outputs of said integrators.

2. An error-corrected integrator comprising: a first integrator having input and output circuits, and having an amplifier and a feedback path around the amplifier, the feedback path including a capacitor having a capacitance, C, and a parallel leakage resistance, R, the parallel leakage resistance causing an error in the output of said first integrator; signal dividing means connected to the output circuit of said first integrator, said signal dividing means presenting as an output a signal substantially equal to $1/RC$ times the output of said first integrator, a second integrator; means for applying as an input to said second integrator the output signal of said signal dividing means; and means for adding the outputs of said first and second integrators.

3. An error-corrected integrator comprising: a first integrator having input and output circuits, and having an amplifier and a feedback path around the amplifier, the feedback path including a capacitor having a capacitance, C, and a parallel leakage resistance, R, the parallel leakage resistance causing an error in the output of said first integrator; means for obtaining a first signal substantially equal to $1/RC$ times the output of said amplifier; a second integrator; means for applying said first signal as an input to said second integrator; and means for adding the outputs of said first and second integrators.

4. In an electric signal integrator having an amplifier and a feedback path around the amplifier, the feedback path including a capacitor having a capacitance, C, and a parallel leakage resistance, R, the improvement for decreasing error due to the leakage resistance comprising: means for obtaining a portion, equal approximately to $1/RC$, of the output of the amplifier; means for integrating the aforesaid portion of the output of the amplifier and obtaining thereby a correction signal; and means for adding together the correction signal and the output of the amplifier, the resulting sum representing the corrected output of the integrator.

5. Integrating apparatus comprising: a plurality of electric integrators, each of said integrators comprising an integrating capacitor and being subject to time-dependent error; means connecting said integrators in cascade, said means operating to apply as an input to each integrator, except the first integrator in the cascade, a signal corresponding to the output of the preceding integrator divided by the effective time constant of said preceding integrator; means connected to the first integrator in the cascade for applying as an input thereto signals to be integrated; and means for combining the output signals of all of said integrators.

6. In an electric signal integrator having an amplifier and a feedback path around the amplifier, the feedback path including a capacitor having a capacitance, C, and a parallel leakage resistance, R, an improvement for decreasing error due to the leakage resistance comprising: means for integrating a fraction, equal approximately to $1/RC$, of the output of the amplifier and obtaining thereby a correction signal; and means for adding together the correction signal and the output of the amplifier, the resulting sum representing the corrected output of the integrator.

7. An error-corrected integrator comprising: a first integrator having input and output circuits, and having an amplifier and a feedback path around the amplifier, the feedback path including a capacitor having a capacitance, C, and a parallel leakage resistance, R, the parallel leakage resistance causing an error in the output of said first integrator; a second integrator; means for applying as an input to said second integrator a portion, equal approximately to $1/RC$, of the output of said first integrator; and means for adding the outputs of said first and second integrators so as to obtain a signal corrected for error due to the leakage resistance, R, of said first integrator.

8. An error-corrected integrator comprising: an integrator for producing an output signal corresponding approximately to the time integral of an input signal applied thereto, said integrator having an amplifier and a feedback path around the amplifier, the feedback path including a capacitor having a capacitance, C, and a parallel leakage resistance, R, said integrator being subject to error due to said parallel leakage resistance; means for obtaining a correction signal approximately equal to $1/RC$ times the time integral of the output signal of said integrator; and means for adding the correction signal to the output signal of said integrator so as to obtain a signal corrected for error due to the parallel leakage resistance, R, of said integrator.

9. Means for decreasing the time dependent error of an electric signal integrator comprising: integrating means for producing an output signal representative of the time integral of an input signal applied thereto; means applying a predetermined portion of the output signal of said electric signal integrator as an input to said integrating means; and means for directly combining the output signals of said electric signal integrator and said integrating means.

10. Electric signal integrating apparatus comprising: a first electric signal integrator for producing an output signal representative of the time integral of an input signal applied thereto, the output signal of said first electric signal integrator being subject to a time-dependent error; a second electric signal integrator for producing an output signal representative of the time integral of an input signal applied thereto; means connected to said first and second electric signal integrators to apply a predetermined portion of the output signal of the former as an input to the latter; and means connected to said first and second electric signal integrators for combining the output signals thereof to produce a resultant signal substantially corrected for the time dependent error of said first electric signal integrator.

References Cited in the file of this patent

UNITED STATES PATENTS

| | | |
|---|---|---|
| 2,621,292 | White | Dec. 9, 1952 |
| 2,850,232 | Hagen et al. | Sept. 2, 1958 |
| 2,917,626 | Usher | Dec. 15, 1959 |
| 2,967,018 | Fogarty | Jan. 3, 1961 |

OTHER REFERENCES

Electronic Analog Computers (Korn & Korn), McGraw-Hill, New York, 1952, pages 48 and 64. (Copy in Div. 23.)

Electronic Engineering (Mynall), September 1947, pages 283, 284.